US010223650B2

(12) United States Patent
Liu et al.

(10) Patent No.: US 10,223,650 B2
(45) Date of Patent: Mar. 5, 2019

(54) ENFORCING CONTEXT MODEL BASED POLICIES WITH FORWARD CHAINING

(75) Inventors: Xin Peng Liu, Beijing (CN); Xi Ning Wang, Beijing (CN); Liang Xue, Beijing (CN); Ke Xin Zhou, Beijing (CN); Yu Chen Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2317 days.

(21) Appl. No.: 12/277,934

(22) Filed: Nov. 25, 2008

(65) Prior Publication Data
US 2009/0138795 A1 May 28, 2009

(30) Foreign Application Priority Data

Nov. 28, 2007 (CN) .......................... 2007 1 0196012

(51) Int. Cl.
*G06F 17/30* (2006.01)
*G06Q 10/06* (2012.01)
*G06F 9/448* (2018.01)
(52) U.S. Cl.
CPC ............. *G06Q 10/06* (2013.01); *G06F 9/448* (2018.02)
(58) Field of Classification Search
None
See application file for complete search history.

(56) References Cited

U.S. PATENT DOCUMENTS

| 7,103,874 | B2 * | 9/2006 | McCollum et al. .......... 717/121 |
| 7,313,575 | B2 * | 12/2007 | Carr et al. ............ 707/999.101 |
| 2002/0169753 | A1 * | 11/2002 | Yoshimura et al. ............. 707/2 |
| 2002/0188643 | A1 * | 12/2002 | Kennedy .......................... 709/1 |
| 2005/0125449 | A1 * | 6/2005 | Wong et al. ............... 707/104.1 |
| 2005/0204054 | A1 * | 9/2005 | Wang et al. .................. 709/232 |
| 2005/0234682 | A1 * | 10/2005 | Graves et al. .................... 703/1 |
| 2006/0106879 | A1 * | 5/2006 | Zondervan et al. .......... 707/200 |
| 2008/0059214 | A1 * | 3/2008 | Vinberg et al. ................... 705/1 |
| 2008/0120685 | A1 * | 5/2008 | Comstock et al. ............... 726/1 |

OTHER PUBLICATIONS

Zhou et al. "COntext MOdel Based SOA Policy Framework" IEEE International Conference on Web Services, 2010.*
Ricci et al. An Agent-Oriented Programming Model for SOA & Web Service, IEEE, Jun. 23, 2007.*

* cited by examiner

*Primary Examiner* — Yuk Ting Choi
(74) *Attorney, Agent, or Firm* — Fabian VanCott; Steven L. Nichols

(57) ABSTRACT

A method for enforcing a number of context model based policies with forward chaining comprising applying a policy set including a plurality of policies to an instantiated context model which includes a set of referenced instance documents in XML format, determining whether the instantiated context model should be updated, if the instantiated context model should be updated, executing an updating operation, re-generating a new instantiated context model according to the updated instance documents and the instantiated context model, and applying the policy set to the new instantiated context model, and wherein the policies include a condition part and an action part.

21 Claims, 7 Drawing Sheets

ENFORCING CONTEXT MODEL BASED POLICIES WITH FORWARD CHAINING

BACKGROUND OF THE INVENTION

The present invention relates to forward chaining in the field of computers. More specifically, the present invention relates to a method for enforcing context model based policies with forward chaining and a policy engine, especially in a Service-Oriented Architecture (SOA) system.

Service-Oriented Architecture (SOA) is a software system architecture which is realized by connecting independent functional entities capable of completing specific tasks to meet requirements of business integration in an Internet or networked environment. In other words, an SOA system incorporates a component model which links different function units (called services) of an application through interfaces and contracts properly defined among these services, wherein the definition of the interfaces is independent of the hardware platform, operating system, and programming language for realizing services. The SOA uses the service-oriented modeling technique and WEB service technique to accomplish loose coupling between systems, and, thus, realize integration and cooperation between the systems.

The SOA policy is an important component of the SOA system and is used for declarative description and execution of the SOA system behavior. In the SOA system, the usage of the SOA policy spans different phases across the SOA lifecycle, including design time validation, deployment time policy publication and package and runtime service selection, change management, and impact analysis.

Generally, the SOA policy can be classified into the following types in different layers: (1) Business policy for business decision making and industry guideline compliance, etc.; (2) Application policy for service selection during service invocation, etc.; and (3) Governance policy for enforcing rules for standards compliance, and defining system behaviors for governance process, etc.

A main feature of SOA is that all the data and contexts are described in XML language, and a document containing such data and contexts is called an SOA metadata document. Generally, the SOA metadata document can include the following: a service metadata document for describing contents relating to a service, a runtime information document for describing contents relating to the runtime information, and a document for describing other business contents. For example, the service metadata document may use Web Service Description Language (WSDL), XML Schema Definition (XSD), Web Service Policy (WS-Policy), Service Component Definition Language (SCDL), Business Process Execution Language (BPEL), Service Component Architecture (SCA) policy, etc. The runtime information document may use Simple Object Access Protocol (SOAP), Representational State Transfer (REST), etc. The document for describing other business contents may use Service Data Object (SDO), Web Ontology Language (OWL), etc.

The SOA policy can be generated by conventional business policy/rule definition tools and transformation mechanism, be generated based on ontology, be generated using Service Modeling Language (SML) Rule and Schematron, or be generated based on a context model constructed by a set of XML documents.

When the policies are enforced using the corresponding policy engines, some policy/rule engines can support forward chaining for reasoning a set of policies/rules applied to specific policy subjects. The so-called forward chaining is a forward chaining for the set of rules in a rule system. Particularly, if the execution of rule 1 changes a state of a target system on which the current set of rules operates and causes rule 2 to be matched and executed, the reasoning from rule 1 applying to and matched with rule 2 is called forwarding. Thus, if there exists a chaining of rule 1→rule 2 . . . →rule n, the reasoning of the rule engine on the whole chain is called forward chaining. Forward chaining is a mechanism which allows the policies/rules applied to the same knowledge space to be inter-triggered; that is, the execution of one policy/rule is triggered by the execution of another policy/rule.

In a forward chaining mechanism, the policies/rules are parsed as a memory model, and variables referenced in the condition part and action part of the policy/rule are represented as memory variables. During the execution of forward chaining, deduction is performed by updating the memory variables and interchanging states across the different policies/rules. FIG. 1 is a schematic diagram showing an example of the existing forward chaining mechanism. As shown in FIG. 1, "WM" represents working memory which could be regarded as a storage unit of variables of the policies/rules. The variable may be changed by another rule's execution. In the forward chaining mechanism, the most time consuming step is matching the WM with the condition part of the policy/rule. This step discovers the effective WMs which have been changed by a rule's execution and which will trigger another rule.

There are lots of forward chaining algorithms in the prior art, and the most famous is the RETE algorithm. The main features of this algorithm are: (1) state-saving, i.e. after each change to the WM, the state (result) of the matching process is saved in $\alpha$ and $\beta$ memories (after the next change of the WM, many of the results are usually unchanged, so the RETE algorithm avoids a lot of re-computation by keeping these results between successive WM changes); (2) sharing of nodes between productions with similar conditions, (i.e. at the output of the network, when two or more productions have a common condition, the RETE algorithm uses a single $\alpha$ memory for the condition rather than creating a duplicate memory for each production, and in the $\beta$ part of the network, when two or more productions have the same conditions, the same nodes are used to match these conditions, thereby avoiding duplication of the matching).

However, existing policy/rule engines with forward chaining lack dedicated solutions for the target system and policy/rule using XML format. For example, the RETE algorithm assumes that both the policies/rules and the context to be validated will be parsed as a memory model to interchange states across different policy/rule's execution. However, in the target system using the XML format, Document Object Model (DOM) consumes a lot of memory, and it is, therefore, difficult to locate specified elements in a large XML document. Thus, the policies/rules and the applied model in XML format are not adapted to be periodically loaded in the memory model. In addition, the traditional way to validate the XML content does not require a memory model, and, thus, the RETE algorithm will lose its position.

The Service Modeling Language (SML) and the SML based policy engine will now be briefly introduced. SML has been defined by IBM, Microsoft, BEA, Intel, etc., for XML-based IT service management. It provides a rich set of constructs for describing models of complex IT services and systems. The SML model is a set of interrelated XML documents. The XML documents contain information about the parts of an IT service, as well as the constraints which each part must satisfy for the IT service to function properly.

The documents in a SML model include definition documents and instance documents. A definition document is described with XML Schema Definition (XSD) language and Schematron Schema language and is a subset of documents in the SML model that describes the schemas and polices/rules that govern the structure and content of the documents in the model. The SML specification defines two kinds of definition documents; (1) XML schema documents which conform to SML's profile of XML schema, and (2) policy/rule documents which conform to SML's profile of Schematron. The policy/rule documents are Boolean expressions that constrain the structure and content of the documents in the model. An instance document is in XML format and is a subset of documents in the SML model that describes the structure and content of the modeled entities.

However, the SML based engine is only for one-step validation of system configuration and report. SML utilizes Schematron as policy/rule expressions to validate its instance documents. According to Schematron specifications, the policies/rules within the standard Schematron can only report diagnosis messages in text string format when there exist violations to policy/rule restrictions. The SML specification extends the capability of validation reports to bring in structured output, but this extension only provides a standard output of elements or attributes, without further semantics. In addition, the Schematron based policies/rules applied to the SML model cannot update the SML model by itself. Therefore, those policies/rules cannot form a chain using the forward chaining mechanism.

BRIEF SUMMARY OF THE INVENTION

According to one embodiment of the present invention, a method for enforcing a number of context model based policies with forward chaining may comprise applying a policy set including a plurality of policies to an instantiated context model which includes a set of referenced instance documents in XML format, determining whether the instantiated context model should be updated, if the instantiated context model should be updated, executing an updating operation, re-generating a new instantiated context model according to the updated instance documents and the instantiated context model, and applying the policy set to the new instantiated context model, wherein the policies include a condition part and an action part.

According to another embodiment of the present invention, a policy engine for enforcing a number of context model based policies with forward chaining may comprise a policy application device that applies a policy set including a plurality of policies to an instantiated context model which includes a set of referenced instance documents in XML format, a updating determining module that determines whether the instantiated context model should be updated, a updating module that executes an updating operation, and a context model regenerator that re-generates a new instantiated context model according to the updated instance documents and the instantiated context model, wherein the new instantiated context model is provided to the policy application device and the policy application device applies the policy set to the new instantiated context model, and wherein the policies include a condition part and an action part.

DETAILED DESCRIPTION OF THE INVENTION

Figure 1:
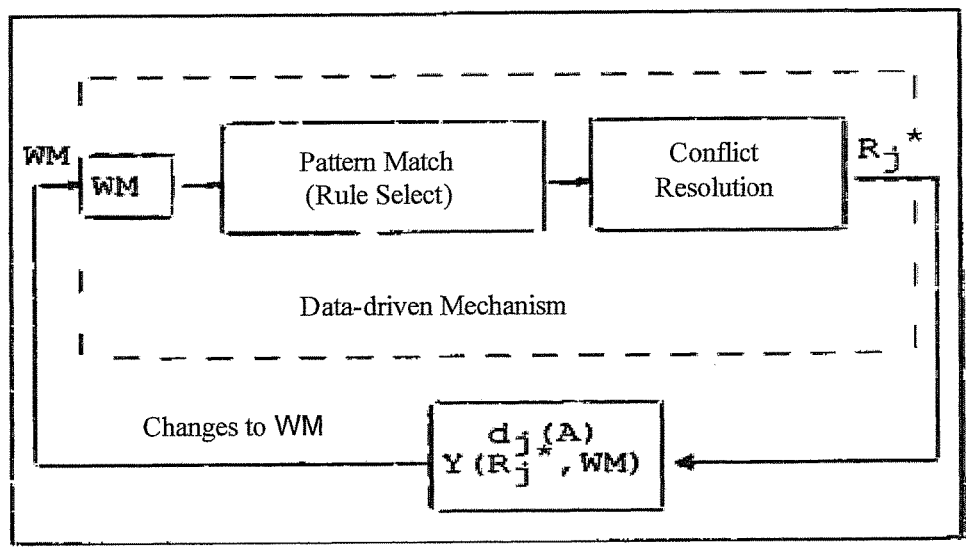
FIG. 1 is a schematic diagram showing an example of the existing forward chaining mechanism.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 has been described in the Background of the Invention and its description is omitted here.

Figure 2:
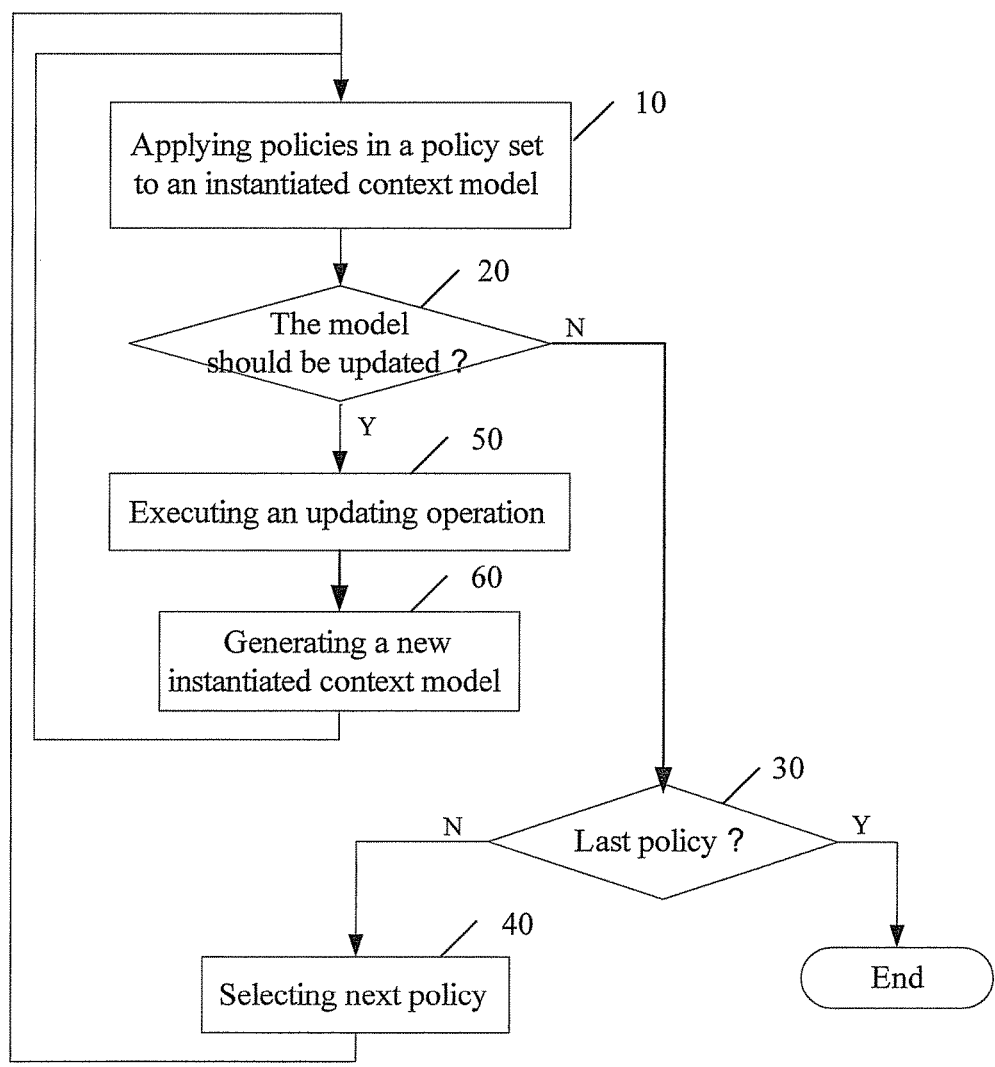
FIG. 2 is a flowchart of a method for enforcing context model based policies with forward chaining according to one embodiment of the present invention.

With reference to the next figure, FIG. 2 is a flowchart of a method for enforcing context model based policies according to one embodiment of the present invention. This embodiment will be described in detail in conjunction with the figure as follows. In this embodiment, a policy is generated based on a context model, and includes a condition part and an action part. The context model is obtained by establishing inter-document references for a set of documents in XML format and aggregating those documents. In an embodiment, the documents in the context model can be in XML Schema Definition Language.

As shown in FIG. 2, at Step 10, a policy set including a plurality of policies is applied to an instantiated context model which comprises a set of referenced instance documents in XML format. In this embodiment, the instantiated context model may be an instance of the context model used in the policy generation. In the instantiated context model, each document in XML Schema Definition Language in the abstract context model for policy generation is replaced with the corresponding XML instance document conforming to the XML Schema definition. The abstract context model may become the instantiated context model on which the policy may be enforced by the replacement of the instance documents.

From the view of XML, when the instantiated context model is described with the syntax defined in the XML specification according to the context model used in the policy generation, the reference identifications to the abstract XML documents in the context model are modified as the reference identifications to the corresponding instance documents. Thus, the aggregation relation among the abstract XML documents becomes the aggregation relation among the gathered instance documents, and the obtained new model is the instantiated context model. From the view of SML, when the instantiated context model is described with the syntax defined in the SML specification, the reference to a Uniform Resource Identifier (URI) of each XML Schema document in the SML aggregation document generated in the policy generation is modified as the reference to a Uniform Resource Identifier (URI) of the corresponding gathered instance document. Thus a new SML aggregation document is generated. The new SML aggregation document and the gathered instance documents form the instantiated context model described with the SML syntax.

Figure 3:
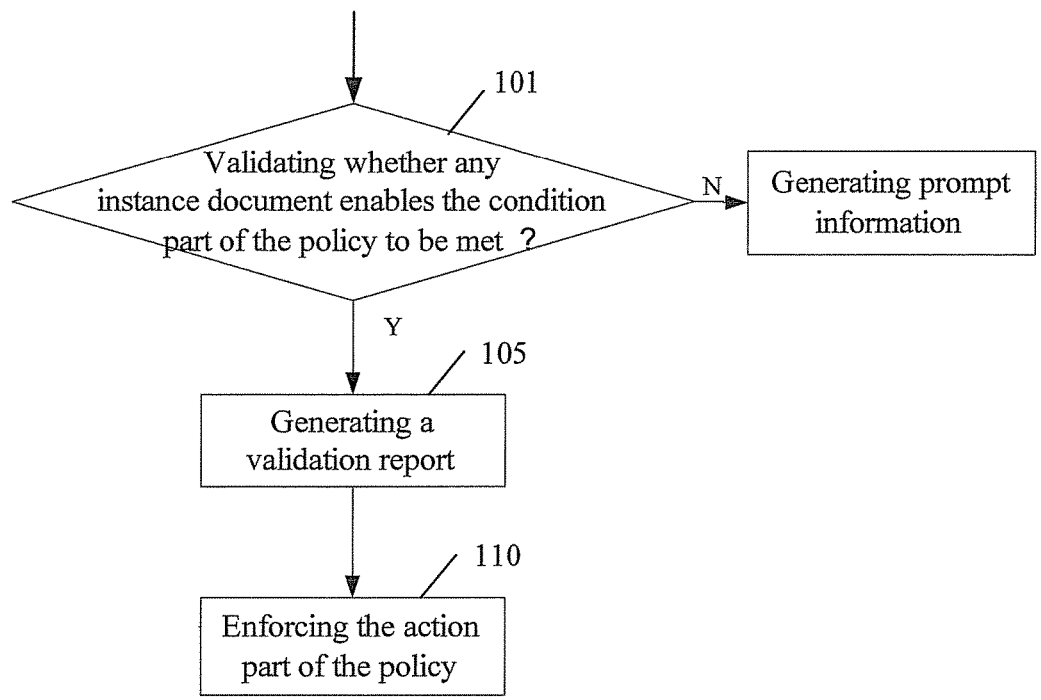
FIG. 3 is a flowchart of the step of applying the policy set to the instantiated context model in the embodiment shown in FIG. 2.

FIG. 3 shows the flowchart of the policy application step (FIG. 2, step 10). As shown in FIG. 3, at step 101, one policy is applied to the instantiated context model to validate whether any instance document in the instantiated context model enables the condition part of the policy to be met. The validation includes two aspects: one is to validate structure of the instance document using a schema document in the policy; the other is to validate content of the instance document using the condition part of the policy. In the case that the policy is based on the SML, a XML schema document is used to validate the structure of the instance document, and a condition part of the policy in Schematron format is used to validate the content of the instance document.

If the structure validation and the content validation of the instance document are matched, it is indicated that the instance document matches the policy. At step 105, a validation report is generated. For example, the syntax for the validation report of the policy described with Schematron is: Action Name {Action Namespace URI} |parameter 1| . . . |parameter n, wherein the expression for each parameter could be a constant string or the following Schematron-allowed tags representing the SML model context:

<valu-of select="XPath Expression for SML model document element or attribute or else"/>, which is used to retrieve XPath specified XML element/attribute value;

<name path="XPath Expression for SML model document element or attribute or else"/>, which is used to get XPath specified XML element/attribute tag name.

In this embodiment, the validation report is same as the action part of the policy. If no instance document is matched, prompt information is generated.

At step 110, according to the generated validation report, the action part of the policy is enforced. In this embodiment, the information of the action semantic module to be enforced is obtained from the validation report and the action semantic module is loaded. The information of the action semantic module includes action name and parameters. The action semantic module can be a common action semantic module provided by the system or an action semantic module defined by the user. Moreover, the action semantic module could be pluggable and be invoked in the runtime. Then, the parameters in the loaded action semantic module are set and thus the action semantic module is executed. The set parameter could be a constant string or a specified value in the instance document.

Back to FIG. 2, at step 20, it is determined whether the instantiated context model should be updated, i.e. whether the enforcement of the action part of the policy will change the instantiated context model (for example, add new instance documents, modify existing instance documents, or remove existing instance documents). If the instantiated context model should not be updated, step 30 is performed to determine whether the policy is the last policy. If it is the last policy, the policy enforcement is finished. If it is not the last policy, the next policy is selected at step 40, and the policy enforcement returns to step 10.

If the instantiated context model should be updated, at step 20, an updating operation is executed at step 50 (i.e. add the new instance documents, modify the existing instance documents, remove the existing instance documents, or combinations thereof). At step 60, a new instantiated context model is re-generated according to the updated instance documents and the instantiated context model. Then the policies in the policy set are re-applied to the new instantiated context model at step 10.

Further, when the policies are re-applied to the new instantiated context model, only the updated instance documents in the new instantiated context model may be validated. In this embodiment, the context model may be a context model describing any IT system other than the Service-Oriented Architecture system. Correspondingly, the policy is not limited as SOA policy, and can be any policy based on the IT system described with the context model.

It can be seen from the above description that the method of enforcing context model based policies with the forward chaining of this embodiment can provide the context model based forward chaining, and has stronger policy/rule reasoning capability. It can interrelate different policies to do the context model based policy reasoning, model self-updating, and multiple policy triggering so that self-healing and self-evolving capabilities may be improved.

Comparing the existing policy enforcement with the forward chaining solution, the method of enforcing context model based policies with forward chaining of this embodiment has advantages over the existing policy enforcement. First, the conventional policy enforcement with forward chaining solution is based on the fact that both the policies/rules and the contents to be validated are parsed as a memory model to interchange states across the different policy/rule enforcements, which will bring the problem on the memory and performance for the large XML document. In contrast, the method of this embodiment is based on the context model to implement the forward chaining, and can update the context model in document granularity, and can apply the policy/rule to the XML documents in the context model in combination with the existing fast processing technologies, such as Simple API for XML (SAX) and Extensible Stylesheet Language Transformations (XSLT).

Second, the existing SML based policy enforcement solution does not allow Schematron based policies/rules to update the SML based context model. However, in the method of this embodiment, the Schematron based policy can be extended to have the action part update the SML model, and the chain of policies/rules can be further triggered using forward chaining mechanisms after the policy/rule is triggered.

Figure 4:
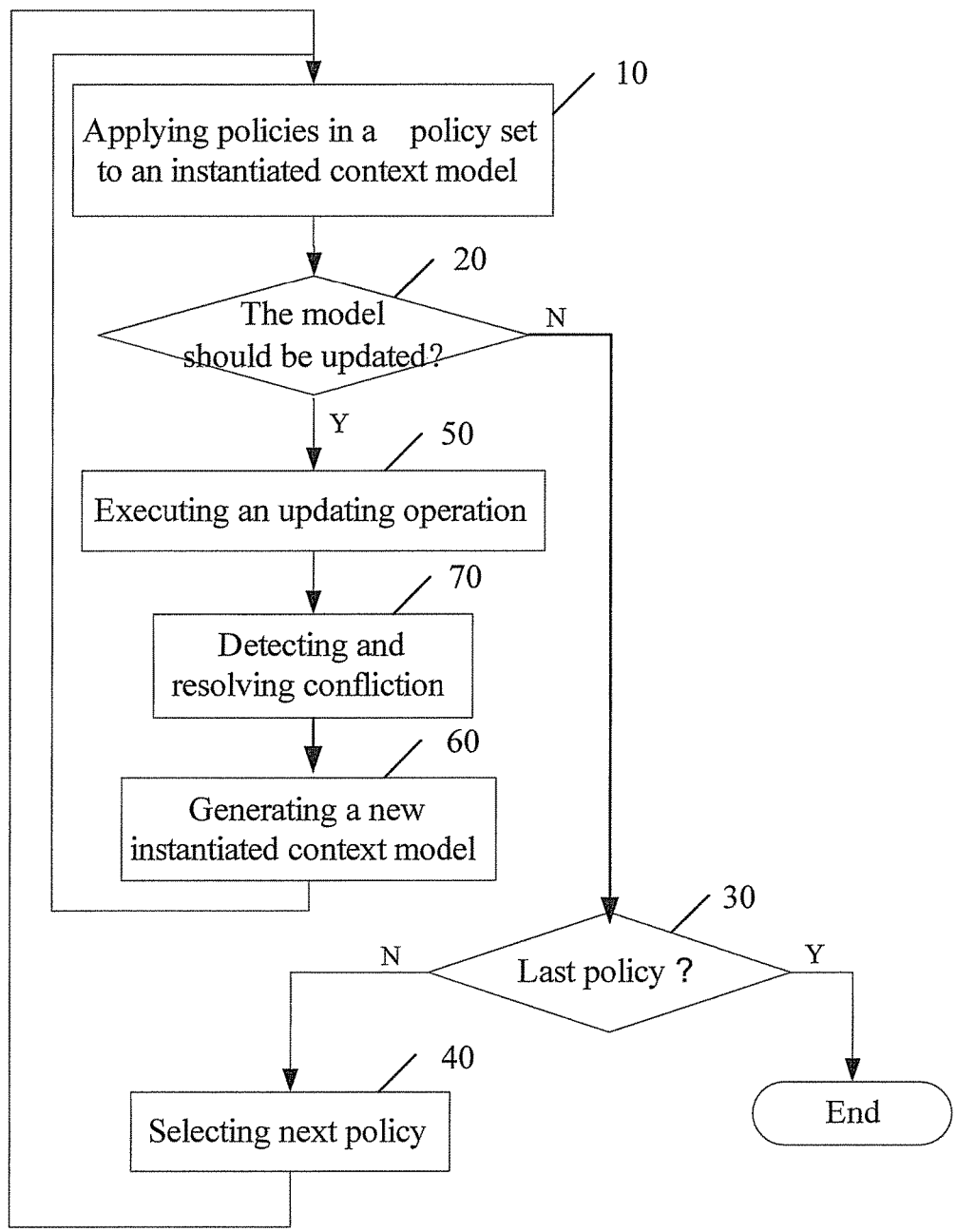
FIG. 4 is a flowchart of a method for enforcing context model based policies with forward chaining according to another embodiment of the present invention.

FIG. 4 is a flowchart of a method for enforcing context model based policies with forward chaining according to another embodiment of the present invention, wherein the descriptions of the portions which are same as those of the previous embodiment are omitted properly. This embodiment will be described in detail as follows in conjunction with the figure. In this embodiment, after the updating operation performed at step 50 is executed, a confliction caused by the updating operation is detected and resolved at Step 70. In this embodiment, the confliction caused by the updating operation includes: (1) content conflict among two or more modifications when only modifying a certain document in the instantiated context model; and (2) both modification and removal simultaneously executed on a certain document in the instantiated context model.

When it is detected that a plurality of modification operations with conflicted modification contents are to be executed on one instance document, it is determined whether there is a modification operation of which the modification content equals or contains the modification contents of other modification operations (i.e. whether the conflicted contents are compatible). If there is a modification operation (i.e. the conflicted contents are compatible), the modification operation is executed on the instance document. If there is no the modification operation (i.e. the conflicted contents are not compatible), which modification operation to be executed on the instance document is determined according to application logic, or a decision is made by human machine interaction. If the above operations cannot resolve the confliction, it is reported that the modification to the document failed, and all the operations causing the confliction are omitted.

When it is detected that both modification operation and removal operation are to be executed on one instance document, the removal operation is executed on the instance document because the removal operation is prior to the modification operation. In one-step policy enforcement, all the modification operations will be invalid as long as there is the removal operation.

An example of the context model described in SML is given as follows to illustrate the method of enforcing context model based SOA policies with forward chaining of the above embodiment. In this example, the instance documents include UserInfos.xml, UserPrivileges.xml, HRService4DepartManagement.wsdl and HRService4StaffManagement.wsdl, wherein the UserInfos.xml and UserPrivileges.xml are as follows:

UserInfos.xml:
    <?xml version="1.0" encoding="UTF-8"?>
    <UserInfos xmlns= "http://example.ibm.com.cn/user">
        <User>
            <ID>000001</ID>
            <Name>Tom</Name>
            <band>9</band>
            <isManager>y</isManager>
        </User>
        ...
    </UserInfos>
UserPrivileges.xml:
    <?xml version="1.0" encoding="UTF-8"?>
    <UserPrivileges xmlns= "http://example.ibm.com.cn/userpvg">
        <UserPrivilege>
            <ID>000001</ID>
            <Role>Manager</Role>

```
        <HRService>
             http://localhost:9080/mrgservices/StaffService
        </HRService>
        <UserPrivilege>
            ....
</UserPrivileges>
```

According to the instance documents, the instantiated context model "Context.xml" is generated. Specifically, a URL path (such as file:/ . . . /UserInfos.xml) of each of the instance documents is first obtained, and then the following XML document is generated as the instantiated context model. This XML document uses each Document element under the DocumentList element to reference the corresponding instance document. When making the reference, the attribute sml:ref="true" defined in the SML specification is used to identify each Document element so that the inter-document reference to the instance document corresponding to the given URL in the sml:uri can be realized. That is, from the view of semantics, XML sub-element of the instance document corresponding to the URL is embedded into each Documents element. The DocumentList element lists the references to all the instance documents, so the following document is an aggregation of all the instance documents from the view of the semantics defined in the SML specification.

The instantiated context model Context.xml is as follows:

```
<?xml version="1.0" encoding="UTF-8"?>
<Context xmlns="http://com.ibm.biz.policy/context/"
xmlns:sml="http://schemas.serviceml.org/sml/2007/02">
    <DocumentList>
       <Document role="role0" sml:ref="true">
          <sml:uri>file:/.../UserInfos.xml</sml:uri>
       </Document>
       <Document role="role1" sml:ref="true">
          <sml:uri>file:/.../UserPrivileges.xml</sml:uri>
       </Document>
     <Document role="role2" sml:ref="true">
        <sml:uri>file:/.../HRService4DepartManagement.wsdl</sml:uri>
     </Document>
       <Document role="role3" sml:ref="true">
          <sml:uri>file:/.../HRService4StaffManagement.wsdl </sml:uri>
       </Document>
    </DocumentList>
</Context>
```

In this example, the policy set to be enforced includes updateRole.sch and updateHRservice.sch as follows:

```
UpdateRole.sch policy:
<?xml version="1.0" encoding="UTF-8"?>
<schema xmlns="http://www.ascc.net/xml/schematron"
         xmlns:sml="http://schemas.serviceml.org/sml/2007/02">
         <title>Update User Role Policy</title>
     <ns uri="http://com.ibm.biz.policy/context/" prefix="ctx"/>
         <ns uri="http://example.ibm.com.cn/user" prefix="usr" />
         <ns uri="http://example.ibm.com.cn/userpvg" prefix="pvg" />
     <ns uri="http://schemas.serviceml.org/sml/function/2006/07" prefix="smlfn"/>
         <pattern name=" Update User Role to Senor Manager">
           <rule context="smlfn:deref(/ctx:Context/ctx:DocumentList/
ctx:Document[@role='role0'])/usr:user">
             <variable name="uid" select="usr:ID/text( )"/>
             <report id="userrole" test="usr:band/text( )>=9 and usr:isManager/text( )='y'">
       UPDATEMODEL {http://com.ibm.cn/soa/standard/example}|<name path="
smlfn:deref(/ctx:Context/ctx:DocumentList
ctx:Document[@role='role1'])/pvg:UserPrivilege[pvg:ID/text( )=$uid]/pvg:Role"/>|SeniorManager
             </report>
           </rule>
         </pattern>
</schema>
UpdateHRservice policy:
<?xml version="1.0" encoding="UTF-8"?>
<schema xmlns="http://www.ascc.net/xml/schematron"
         xmlns:sml="http://schemas.serviceml.org/sml/2007/02">
         <title>Update UR Service Endpoint Policy</title>
     <ns uri="http://com.ibm.biz.policy/context/" prefix="ctx"/>
             <ns uri="http://example.ibm.com.cn/userpvg" prefix="pvg" />
     <ns uri="http://schemas.xmlsoap.org/wsdl/" prefix="wsdl" />
     <ns uri="http://schemas.xmlsoap.org/wsdl/soap/" prefix="wsdlsoap" />
     <ns uri="http://schemas.serviceml.org/sml/function/2006/07" prefix="smlfn"/>
         <pattern name="Update UR Service Endpoint Manager">
           <rule context="smlfn:deref(/ctx:Context/ctx:DocumentList/
ctx:Document[@role='role1'])/pvg:UserPrivilege">
             <report id="endpoint" test="pvg:Role/text( )='SeniorManager'">
       UPDATEMODEL {http://com.ibm.cn/soa/standard/example}|<name path="pvg:HRService"/>| <value-of
select="smlfn:deref(/ctx:Context/ctx:DocumentList/ctx:Document[@role='role2'])//wsdl:port[@name='HRSer
vice4DepartManagement']/wsdlsoap:address/@location"/>
             </report>
           </rule>
         </pattern>
</schema>
```

When the above two policies are applied to the instantiated context model Context.xml, and if the updateRole.sch policy is matched first, the enforcement result of the action of the policy is that in the UserPrivileges.xml, the role of the user with ID 000001 is updated to "SeniorManager," and the instantiated context mode Context.xml is updated. Then the above policies are applied to the new instantiated context model and the updateHRservice policy is matched. Then the action of the updateHRservice policy is enforced. The HRService endpoint is updated to the one HRservice contained in the HRService4StaffManagement.wsdl.

Figure 5:
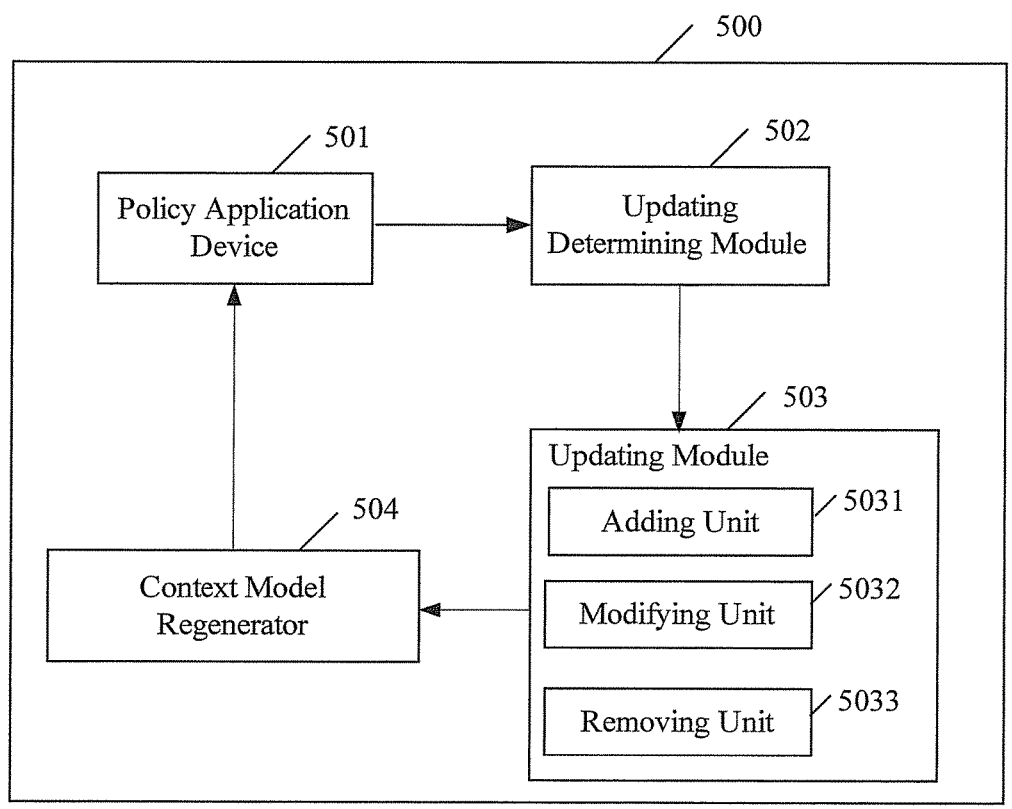
FIG. 5 is a schematic block diagram of a policy engine for enforcing context model based policies with forward chaining according to one embodiment of the present invention.

Under the same inventive concept, FIG. 5 is a schematic block diagram of a policy engine for enforcing context model based policies with forward chaining according to one embodiment of the present invention. In this embodiment, the descriptions of the portions which are the same as those of the previous embodiment are omitted properly. This embodiment will be described in detail as follows in conjunction with the figure. In this embodiment, as described in the above, the policy is generated based on the context model and includes a condition part and an action part. The context model is obtained by establishing inter-document references for a set of documents in XML format and aggregating these documents. In an embodiment, the documents in the context model may be in the documents in XML Schema Definition Language.

As shown in FIG. 5, the policy engine (500) for enforcing context model based policy with forward chaining of this embodiment comprises: a policy application device (501) that applies a policy set including a plurality of policies to an instantiated context model which includes a set of referenced instance documents in XML format; an update determining module (502) that determines whether the instantiated context model should be updated; an updating module (503) that executes an updating operation; and a context model regenerator (504) that re-generates a new instantiated context model according to the updated instance documents and the instantiated context model; wherein the new instantiated context model is provided to the policy application device (501), and the policy application device (501) applies the policy set to the new instantiated context model.

When the policy engine (500) enforces the context model based policies, the policy application device (501) first applies a policy set including a plurality of policies to the instantiated context model, wherein the instantiated context model includes a set of referenced instance documents in XML format. As stated in the above, the instantiated context model can be an instance of the abstract context model used in the policy generation, wherein the instance documents are the XML instance documents which conform to the XML Schema definition in the corresponding abstract context model.

Figure 6:
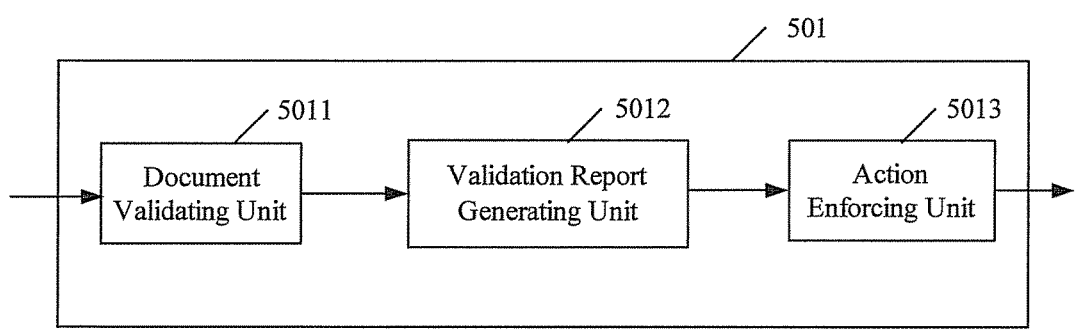
FIG. 6 is a schematic block diagram of the policy application device in the embodiment shown in FIG. 5.

FIG. 6 shows a schematic block diagram of the policy application device (501). As shown in FIG. 6, in the policy application device (501), a document-validating unit (5011) may apply each policy in the policy set to the instantiated context model to validate whether any instance document in the instantiated context model enables the condition part of the policy to be met. In an embodiment, a structure-validating unit (not shown) in the document-validating unit (5011) validates the structure of the instance document using the schema document in the policy. And then a content-validating unit (not shown) in the document-validating unit (5011) validates the content of the instance document using the condition part of the policy. If the validation result is that the condition part of the policy is met, a validation-report-generating unit (5012) generates the validation report. The validation report contains the information of the action part of the policies to be enforced. Particularly, the information includes the action name and the parameters. Then an action-enforcing unit (5013) enforces the actions of the corresponding policies. In this embodiment, in the action-enforcing unit (5013), a loading unit loads the corresponding action semantic modules. In this embodiment, the action semantic module can be a common action semantic module provided by the system or an action semantic module defined by the user. Then a parameter-setting unit sets the parameters of the action semantic modules and an executing unit executes the action semantic modules. The set parameters can be constant strings or specified values in the instance documents.

Returning again to FIG. 5, after the action-enforcing unit (5013) enforces the actions of the matched policy, an update-determining unit (502) determines whether the instantiated context model should be updated, i.e. whether the enforcement of the policy will change the instantiated context model (for example, add instance documents, modify instance documents, remove instance documents, or a combination thereof. If the update-determining unit (502) determines that the instantiated context model should be updated, an updating unit (503) performs the corresponding updating operation. In this embodiment, in the updating unit (503), an adding unit (5031) is used to add an instance document, a modifying unit (5032) is used to modify the existing instance document, and a removing unit (5033) is used to remove the existing instance document from the instantiated context model. Then the updated instance documents are provided to the context model regenerator (504) and are combined with the instantiated context model to generate a new instantiated context model. The new instantiated context model is provided to the policy application device (501). Next the policy application device (501) applies the policies in the policy set to the new instantiated context model. Further, when the policy application device (501) applies the policies in the policy set to the new instantiated context model, it may only validate the updated instance documents in the new instantiated context model.

It should be noticed that the policy engine (500) for enforcing context model based policies with forward chaining of this embodiment and its components can be implemented by a hardware circuit such as a Very Large Scale Integrated Circuit or a gate array, a semiconductor such as logic chips and transistors, or a programmable hardware device such as a field programmable gate array, a programmable logic device, by software executed on various types of processors, or by the combination of above hardware circuit and software. Also, the policy engine (500) for enforcing context model based policies with forward chaining of this embodiment may be operatically applied to the method for enforcing context model based policies with forward chaining of the embodiment shown in FIG. 2.

Figure 7:
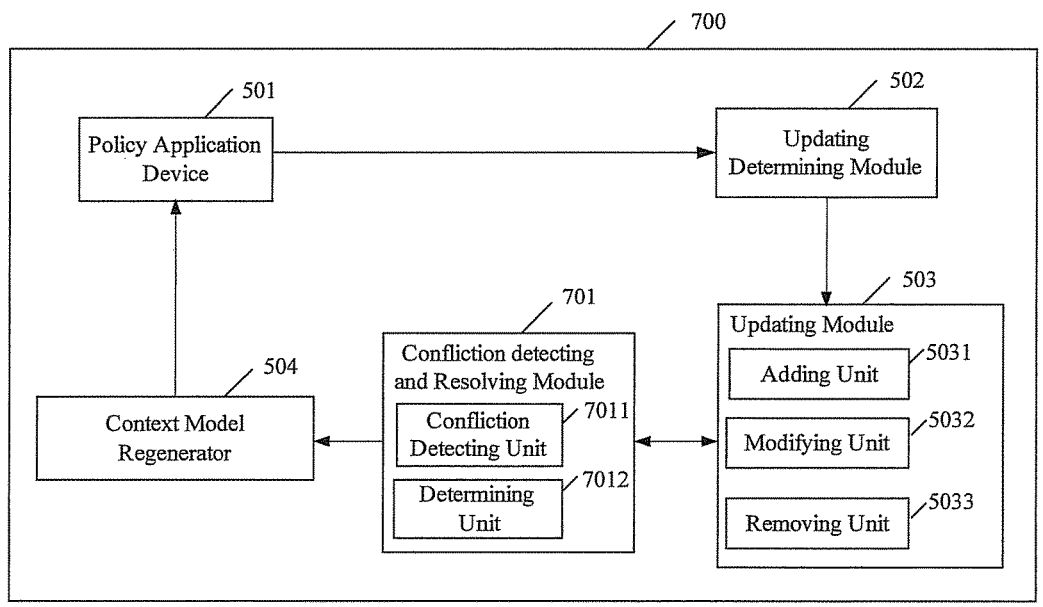
FIG. 7 is a schematic block diagram of a policy engine for enforcing context model based policies with forward chaining according to another embodiment of the present invention.

FIG. 7 is a schematic block diagram of a policy engine for enforcing context model based policies with forward chaining according to another embodiment of the present invention, wherein the descriptions of the portions which are same as those of the previous embodiment are omitted properly. This embodiment will now be described in detail as follows in conjunction with the figure. The policy engine (700) for enforcing context model based policies with forward chaining of this embodiment may further comprise a confliction detecting and resolving module (701) which detects whether there is a confliction caused by the updating operation and resolves the confliction, except for the policy engine for enforcing context model based policies with forward chaining of the embodiment shown in FIG. 5.

In this embodiment, after the updating unit (503) executes the updating operation, in the confliction detecting and resolving module (701), a confliction-detecting unit (7011) detects the confliction caused by the updating operation of the updating unit (503). When the confliction-detecting unit (7011) detects that a plurality of modification operations with conflicted modification contents is to be executed on one instance document, a determining unit (7012) determines whether there is a modification operation of which the modification content equals or contains the modification contents of other modification operations. When the determining unit (7012) determines that there is the modification operation, the modifying unit (5032) executes the modification operation on the instance document. When the determining unit (7012) determines that there is no the modification operation, the modifying unit (5032) executes the modification operation determined by the application logic. When the confliction-detecting unit (7011) detects that both modification operation and removal operation are to be executed on one instance document, the removing unit (5033) executes the removal operation on the instance document.

The policy engine (700) for enforcing context model based policies with forward chaining of this embodiment and its components may be implemented by a hardware circuit such as a Very Large Scale Integrated Circuit or a gate array, a semiconductor such as logic chips and transistors, or a programmable hardware device such as a field programmable gate array, a programmable logic device, by software executed on various types of processors, or by the combination of above hardware circuits and software. Also, the policy engine (700) for enforcing context model based policies with forward chaining of this embodiment may operatically realize the method for enforcing context model based policies with forward chaining of the embodiments shown in FIG. 4.

Although the method for enforcing context model based policies with forward chaining and the policy engine are described in detail in conjunction with the preferred embodiment, the present invention is not limited as above. It should be understood for persons skilled in the art that the above embodiments may be varied, replaced, or modified without departing from the spirit and the scope of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for enforcing a number of context model based policies with forward chaining, the method comprising:

applying a policy set, including a plurality of policies each having a condition part and an action part, to an instantiated context model, in which the instantiated context model is derived by replacing each document in an abstract context model with a corresponding instance document, and in which the instantiated context model comprises a number of referenced instance documents;

determining whether the instantiated context model should be updated;

in response to said determination indicating that the instantiated context model should be updated, executing an updating operation to produce updated instance documents;

generating a new instantiated context model according to the updated instance documents; and applying the policy set to the new instantiated context model to facilitate communication among components in a Service Oriented Architecture.

2. The method of claim 1, wherein the updating operation comprises at least one of an instance document adding operation, an instance document modification operation and an instance document removal operation, or combinations thereof.

3. The method of claim 1, further comprising detecting and resolving a confliction caused by the updating operation.

4. The method of claim 3, wherein the confliction caused by the updating operation comprises a plurality of modification operations with conflicted modification contents executed on one instance document; and modification operation and removal operation simultaneously executed on one instance document.

5. The method of claim 3, in which detecting and resolving a confliction caused by the updating operation comprises:
when detecting that the plurality of modification operations with conflicted modification contents is to be executed on one instance document, determining whether there is a modification operation of which the modification content equals or contains the modification contents of other modification operations;
in response to said determination indicating that there is the modification operation, executing the modification operation on the instance document;
in response to said determination indicating that there is no modification operation, determining which modification operation is to be executed on the instance document according to application logic; and
when detecting that both modification operation and removal operation are to be executed on one instance document, executing the removal operation on the instance document.

6. The method of claim 1, wherein the step of applying the policy set to the new instantiated context model is performed only on the updated instance documents in the new instantiated context model.

7. The method of claim 1, wherein the step of applying a policy set including a plurality of policies to an instantiated context model comprises:
validating whether any instance document in the instantiated context model enables the condition part of the policy to be met by using each of the plurality of policies;
in response to the condition part of the policy is met, generating a validation report; and
enforcing the action part of the policy according to the validation report.

8. The method of claim 7, wherein the step of validating whether any instance document in the instantiated context model enables the condition part of the policy to be met comprises:
validating structure of the instance document in the instantiated context model using a schema document in the policy; and
validating content of the instance document in the instantiated context model using the condition part of the policy.

9. The method of claim 7, wherein the step of enforcing the action part of the policy comprises:
loading an action semantic module in the action part;
setting parameters of the action semantic module; and
executing the action semantic module.

10. The method of claim 1, wherein said instance documents are in XML format.

11. A computer-implemented policy engine for enforcing a number of context model based policies with forward chaining, the policy engine comprising:
at least one processor; and
a memory communicatively coupled to said at least one processor, said memory storing machine-executable instructions that, when executed by said at least one processor, cause said at least one processor to implement:
a policy application device that applies a policy set including a plurality of policies to an instantiated context model, the instantiated context model comprising a set of referenced instance documents in XML format, the set of referenced instance documents comprising inter-document references among the instance documents within the set of referenced instance documents and wherein the instantiated context model is derived by replacing at least one document in an abstract context model with a corresponding instance document;
an updating determining module that determines whether the instantiated context model should be updated;
an updating module that executes an updating operation;
a context model regenerator that re-generates a new instantiated context model according to the updated instance documents and the instantiated context model; and
in which the new instantiated context model is provided to the policy application device and the policy application device applies the policy set to the new instantiated context model; and
in which the policies include a condition part and an action part.

12. The policy engine of claim 11, wherein the updating module comprises:
an adding unit that adds instance document;
a modifying unit that modifies instance document; and
a removing unit that removes instance document.

13. The policy engine of claim 11, further comprising a confliction detecting and resolving module that detects and resolves a confliction caused by the updating operation.

14. The policy engine of claim 13, wherein the confliction caused by the updating operation comprises: a plurality of modification operations with conflicted modification contents executed on one instance document; and modification operation and removal operation simultaneously executed on one instance document.

15. The policy engine of claim 13, wherein the confliction detecting and resolving module comprises:
a confliction detecting unit that detects the confliction caused by the updating operation;
a determining unit that determines whether there is a modification operation of which the modification content equals or contains the modification contents of other modification operations when the confliction detecting unit detects that the plurality of modification operations with conflicted modification contents is to be executed on one instance document;
wherein if the modifying unit executes the modification operation on the instance document in response to determining that the modification operation exists;
the modifying unit executes the modification operation determined by application logic in response to determining that there is no such modification operation; and
wherein when the confliction detecting unit detects that both modification operation and removal operation are to be executed on one instance document, the removing unit executes the removal operation on the instance document.

16. The policy engine of claim 11, wherein the policy application device only applies the policy set to the updated instance documents in the new instantiated context model.

17. The policy engine of claim 11, wherein the policy application device comprises:
a document validating unit that validates whether any instance document in the instantiated context model enables the condition part of the policy to be met by using each of the plurality of policies;

a validation report generating unit that generates a validation report when the condition part of the policy is met; and an action enforcing unit that enforces the action part of the policy according to the validation report.

18. The policy engine of claim 17, wherein the document validating unit comprises:

a structure validating unit that validates structure of the instance document in the instantiated context model using a schema document in the policy; and a content validating unit that validates content of the instance document in the instantiated context model using the condition part of the policy.

19. The policy engine of claim 17, wherein the action forcing unit comprises:

a loading unit that loads an action semantic module in the action part;

a parameter setting unit that sets parameters in the action semantic module; and an executing unit that executes the action semantic module.

20. The policy engine of claim 11, wherein the policy is the Service-Oriented Architecture policy.

21. A computer program product for enforcing a number of context model based policies with forward chaining, the computer program product comprising:

a non-transitory computer readable medium comprising computer usable program code embodied therewith, the computer usable program code comprising:

computer usable program code to, when executed by a processor, apply a policy set, including a plurality of policies each having a condition part and an action part, to an instantiated context model, in which the instantiated context model is derived by replacing each document in an abstract context model with a corresponding instance document, and in which the instantiated context model comprises a number of referenced instance documents.

* * * * *